United States Patent [19]

Kerner et al.

[11] Patent Number: 5,034,207
[45] Date of Patent: Jul. 23, 1991

[54] FINELY, DIVIDED, PRECIPITATED SILICA WITH HIGH STRUCTURE, METHOD OF ITS PREPARATION AND USE

[75] Inventors: Dieter Kerner, Hanau; Adolf Wagner, Gelnhausen; Felix Schmidt, Rheinfelden; Dietrich Bauer, Breuberg-Sandbach, all of Fed. Rep. of Germany

[73] Assignee: Degussa Aktiengesellschaft, Frankfurt am Main, Fed. Rep. of Germany

[21] Appl. No.: 542,809

[22] Filed: Jun. 22, 1990

Related U.S. Application Data

[63] Continuation of Ser. No. 483,968, Feb. 15, 1990, abandoned, which is a continuation of Ser. No. 347,654, May 5, 1989, abandoned.

[30] Foreign Application Priority Data

May 7, 1988 [DE] Fed. Rep. of Germany ....... 3815670

[51] Int. Cl.$^5$ .............................................. C01B 33/18
[52] U.S. Cl. .................................................... 423/339
[58] Field of Search ................................ 423/335, 339

[56] References Cited

U.S. PATENT DOCUMENTS

| | | | |
|---|---|---|---|
| 4,001,379 | 1/1977 | Turk et al. | 423/339 |
| 4,179,431 | 12/1979 | Kilian et al. | 423/339 |
| 4,332,600 | 1/1982 | Wegerhoff et al. | 423/339 |
| 4,495,167 | 1/1985 | Nauroth et al. | 423/339 |

Primary Examiner—Olik Chaudhuri
Assistant Examiner—Ken Horton
Attorney, Agent, or Firm—Beveridge, DeGrandi & Weilacher

[57] ABSTRACT

Finely divided precipitated silica for use as a delustering agent with high structure and a

| | |
|---|---|
| BET surface (DIN 66 132) | of 150 to 350 m$^2$/g |
| Stamping density (DIN 53 194) | between 60 and 120 g/l |
| DBP absorption number | between 3.0 and 4.0 ml/g |
| Particle size distribution | at least 70% from 1 to 6 μm | can be prepared by heating a mixture of water and sodium silicate under agitation to a temperature of 70° to 80° C., adding concentrated sulfuric acid into this mixture until half of the alkali present has been neutralized, shearing the reaction mixture and optionally raising the temperature at the same time to 86°±5° C. Concentrated sulfuric acid is added after a period of 30 to 120 minutes at a rather high rate until the pH of the silica suspension produced is 3.0 to 3.5. The resulting silica suspension is ultimately filtered off by known filter devices, the silica filter cake washed free of sulfate, and a dry product is ultimately obtained.

8 Claims, No Drawings

FINELY, DIVIDED, PRECIPITATED SILICA WITH HIGH STRUCTURE, METHOD OF ITS PREPARATION AND USE

REFERENCE TO A RELATED APPLICATION

The present application is a continuation of our copending application Ser. No. 07/483,968 filed Feb. 15, 1990, now abandoned, which in turn is a continuation of our copending application Ser. No. 07/347,654 filed May 5, 1989, now abandoned, the entire disclosures of which applications are relied on and incorporated herein by reference.

INTRODUCTION AND BACKGROUND

The present invention relates to a finely divided silica with high structure, a method of preparing the silica and the use of the silica as a delustering agent in films of the paint, lacquer, varnish and enamel type.

It is known that the delustering capacity of a silica depends on various factors such as e.g. the type of silica, the particle size, the refraction index and also on the vehicle system. Particle form and particle-size distribution of the secondary particles as well as the total effective specific particle volume are of particular significance.

A number of other requirements are placed on delustering silicas in addition to high efficiency, expressed by the reduction of the degree of glossiness in comparison to a non-matte paint film. Thus, for example, the drying behavior of the film coatings should not be adversely affected, no excessive thickening of the paint coating system should occur and the scratch resistance of the film coatings should not be lowered by the silica added. The behavior in suspension of the silica is an important point. The tendency of silica to settle and to form hard sediment which can only be stirred up again with difficulty can be prevented or at least improved by a number of measures. Thus, for example, DE-AS 15 92 865 describes the impregnation of silica during the preparation process by means of wax emulsions.

The addition of synthetic silica as delustering agent is known. See for example the publications:

EPO-Patent 0,008,613
German Patent 24 14 478
German DAS 17 67 332
German OLS 16 69 123
German DAS 15 92 865.

Numerous methods of preparing synthetic silica are also known (cf. Ferch in "Chem.-Ing.-Techn." 48, pp. 922-33 (1976)).

According to German Patent 24 14 478, aerogel-like delustering agents can be obtained by the structuring of pyrogenically prepared silica. To this end, pyrogenic silica is moistened with alkaline adjusted water, ground and dried. This procedure of preparing delustering agents is complicated and expensive.

The delustering agent according to German Patent 24 14 478 is an excellent delustering agent. However, it has the disadvantage that it thickens the film compositions too heavily. A solvent must therefore be added in addition for working with a spray gun to facilitate application of the films to a surface to be coated.

A wax-coated precipitated silica acid is prepared according to the process described in DE-PS 15 92 865 and is used as delustering agent. This delustering agent has the disadvantage, however, that the paints prepared with it exhibit an undesirable blue bloom on dark surfaces.

SUMMARY OF THE INVENTION

It is an object of the present invention to provide a finely divided precipitated silica of high structure with certain desired characteristics and especially to achieve a great savings of solvent while retaining the desired delustering action.

Another object of the invention is to prepare a wax-coated delustering agent which does not exhibit a blue bloom and has a better delustering action.

In more particular detail, an object of the present invention is to provide finely divided precipitated silica with a high structure and the following characteristics:

| | |
|---|---|
| BET surface (DIN 66132) | between 150 and 350 m$^2$/g |
| Stamping density (DIN 53194) | between 60 and 120 g/l |
| DBP number | between 3.0 and 4.0 ml/g |
| Particle size distribution (measured with a Coulter counter) (The determination is performed according to DE-PS 17 67 332, column 2, lines 30–64.) | at least 70% from 1 to 6 μm |

In order to determine the particle size with a Coulter counter, approximately 0.5 g silica acid are dispersed in 50 ml isotonic solution of common salt (0.5% NaCl and 0.089% Na$_4$P$_2$O$_7$. 10 M$_2$O in distilled water) with a magnetic stirrer and subsequently treated for 1 minute with supersonics (200 watts). This suspension is added to 200 ml isotonic solution of common salt and agitated.

A measuring capillary tube is immersed into the agitated suspension and an electric field is applied thereto. When the particles pass through the measuring capillary tube, the electric field is varied as a function of the particle size.

It is still a further object of the invention to provide a method for preparing finely divided precipitated silica with a high structure processing the following characteristics:

| | |
|---|---|
| BET surface (DIN 66 132) | of 150 to 350 m$^2$/g |
| Stamping density (DIN 53 194) | between 60 and 120 g/l |
| DBP number | between 3.0 and 4.0 ml/g |
| Particle size distribution | at least 70% from 1 to 6 μm. |

The method of the invention is characterized by forming a mixture of water and sodium silicate which is then heated under agitation to a temperature of 70° to 80° C. Concentrated sulfuric acid is then dosed into this mixture until half of the alkali (sodium) present has been neutralized. The reaction mixture is treated by a shearing unit and, optionally, the temperature raised at the same time to 86°±5° C. Concentrated sulfuric acid is added after a waiting period of 30 to 120 minutes at a rather high rate of addition until the pH of the silica suspension produced is 3.0 to 3.5. The silica suspension is optionally diluted with water and the coarse portion optionally separated by a centrifugal pump and a hydrocyclone. The silica is filtered off by known filter devices and the resulting silica filter cake is washed free of sulfate. Then, the silica filter cake is redispersed with the addition of water using an agitator unit to form a suspension with a solid content of 80±10 g/l. Alkyl dimethylbenzyl ammonium chloride is optionally added to this suspension, and the suspension obtained in this manner is spray-dried. The recovered dried product can then be ground, if desired.

DETAILED DESCRIPTION OF THE INVENTION

In carrying out the present invention, silica particles are prepared with particle diameters in a particle-size range of 1 to 6 $\mu$m. Particles smaller that 1 $\mu$m are ineffective for delustering purposes and generally cause an undesirable thickening of the film vehicle. On the other hand, particles which are too large result in a disadvantageous roughness of the surface in the film coating. The object is to control appropriate sizes during the precipitation reaction and to retain chosen particle sizes by suitable measures until the finished product is obtained. In order to assure that all particles find the same conditions of growth, the entire charge of water glass starting material is put into a receiver at the beginning of the process for production. The addition of sulfuric acid is performed in two steps. In the first step, the addition of acid is measured in such a manner that the silica begins to flocculate after the end of the first stage of the addition of the acid. During this growth phase, in order to prevent an excessive particle growth, shearing is performed in addition to the agitation. The addition of acid remains interrupted until the desired particle spectrum has been achieved. Subsequently, the remaining alkali content of the water glass is neutralized in a second stage, during which shearing is continued. After a slightly acidic pH has been achieved, the precipitation reaction is terminated.

The concentrated sulfuric acid used for purposes of the present invention is conventional and, for example, is in the range of D=1.75 to 1.85 and 90 to 97% by weight.

The silica suspension is worked up and conditioned in the customary manner. There is the possibility that hard and coarse particles are produced in the course of the reaction by local excess acidifying. These undesired particles can be removed from the suspension with the aid of a hydrocyclone. The filtration of the suspension is performed e.g. with a plate-and-frame press in which the filter cake is washed free of sulfate. The washed filter cake is redispersed in water, a cationic tenside is optionally added and the product is then spray-dried. The cationic tenside (surfactant) brings about a displacement of the water from the particle surface thereby even in the aqueous phase, which suppresses to a great extent the shrinking process which takes place during the drying process. In this manner, it is possible to prevent the particles from clumping together to rather large, solid formations during drying. Depending on the desired degree of fineness, the silica can be used as is or additionally ground. As a result of the procedure described herein, a light grinding is sufficient, that is, only little grinding energy need be expended in order to disagglomerate the particles again.

The precipitated silica of the present invention can be used as delustering agent in a wide variety of film coatings such as paints, varnishes, lacquers and the like.

It has the advantage that no additional solvent need be used.

In order to improve the sedimenting behavior of the silica products in coating film compositions, an impregnation with emulsions is carried out in accordance with the disclosure of DE-PS 15 92 865, incorporated herein by reference.

A still further object of the invention is to provide a precipitated silica which is coated by an emulsion and prepared from the precipitated silica in accordance with the present invention. In this aspect of the invention, the coating can take place according to the known method of DE-PS 15 92 865 which corresponds to U.K. Patent 1,236,775, the entire disclosure of which is relied on and incorporated by reference.

The coated precipitated silica exhibits a carbon content of 1 to 8% by weight in addition to the same physical and chemical characteristic data of the uncoated precipitated silica.

In one embodiment of the invention, the precipitated silica can be coated by a silicon oil emulsion.

This precipitated silica can be used as delustering agent in paints, varnishes, lacquers and the like.

In a further particular embodiment of the invention, the precipitated silica can be coated by a polyethylene wax emulsion.

This precipitated silica product can be used as delustering agent in paints, varnishes, lacquers and the like.

It is especially advantageous that the precipitated silica coated with the wax emulsion does not generate a blue bloom in the paint surfaces.

All manner of film forming components can be combined with the delustering agents of the invention.

The following examples serve to illustrate the details of the present invention.

The method of the invention is carried out in known apparatuses.

The core of the precipitation apparatus used herein is a hard-rubberized, double-jacketed vessel with a volume of 120 liters which is provided with an agitator mechanism. Potential agitators suitable for the invention are e.g. anchor mixers, straight-arm paddle agitators or turbines. The reaction vessel can be heated with oil as heat carrier and thermostatted via the double jacket. A discharge pipe or tube is fixed to the bottom of the reaction vessel which pipe comprises a branch line in front of the bottom discharge valve. This branch runs to a shearing unit (Dispax reactor) with which the content of the reaction vessel can be rotated. The rotated precipitation suspension can be reintroduced into the top of the reaction vessel via the pipeline fixed to the pressure side of the shearing unit. The addition of water glass takes place either via a dosing pump from a storage vessel or directly from a vat by a vat pump. The sulfuric acid is dosed from a storage vessel by a dosing pump.

The precipitation suspension is pumped for filtration with the aid of a positive-displacement pump into a plate-and-frame press on which the filter cake produced is washed free of sulfate with water.

The washed filter cake is either placed on metal sheets and dried in a drying oven or is dispersed in water and spray-dried.

The dried silica can be subsequently ground. The product dried in a drying oven must generally be preground in a toothed-disk mill before the fine grinding by means of a pin mill or air-jet mill. The spray-dried product can either be used directly or subjected to a fine grinding.

The efficiency of the non-coated precipitation silica prepared according to Examples 1-6 is compared in a black baking varnish with the product prepared according to DE-PS 24 14 478. In addition to the solvent requirement, the degree of glossiness according to Lange at a reflection angle of 60° and the grindometer value according to Hegman are evaluated.

For the determination of the degree of glossiness, which is a measure for the delustering power of the tested delustering silica, the gloss meter according to B. Lange, which is often used in Germany, is used. The Lange gloss meter uses an angle of 45° as incident and reflection angle. The measured degrees of glossiness are indicated in percents. The smaller their value, the better the delustering capacity of the silica tested, or, in other words, the less delustering agent needs to be used in order to achieve a quite specific degree of gloss.

The determination of grindometer value is carried out with the aid of a grindometer. The grindometer value, which is measured in $\mu$, is a measure for the coarsest particles located in the finished, sprayable film composition mixture after the delustered silica has been stirred in. It can be related to the formation of specks in the dry paint film. The feared and undesired "spray grain" can be recognized with the aid of the grindometer.

The paint used has the following composition:

7.5 parts by weight paint prepaste Tack ® 1

47 parts by weight fatty-acid modified alkyd resin 60% in xylene (Alftalat AR 481 m)

24 parts by weight melamine resin Maprenal MF 800 55% in isobutanol 6 parts by weight butanol 10.5 parts by weight xylene 1 part by weight silicon oil Baysilon paint additive OL 17 1% in xylene.

2.6 parts by weight product are worked in at a time. The working in is carried out by ten-minute agitation with a wing agitator at 2000 rpms. The paint is sprayed onto metal sheets in a dry layer approximately 30 $\mu$m thick, air-dried and annealed 30 min. at 180° C.

The values determined can be gained from table 2 below.

Example 1

66 kg Water and 21 kg soda water glass (d=1.35 g/cm$^3$; ratio $SiO_2:Na_2O$=3.3) are added into the precipitation vessel and the mixture heated under agitation to 75° C. Concentrated sulfuric acid (d=1.83) is dosed into the precipitation mixture at a rate of 1.45 l/h. After 25 minutes of precipitation time, the shearing unit (Dispax reactor) is switched on. Shortly after the end of the addition of acid, silica begins to flocculate and the temperature of the precipitation is raised to 85° C. The supply of acid is interrupted for 20 minutes (waiting stage). After 50 minutes, the further addition of acid takes place with 1.8 l/h over a period of 15 minutes. The silica suspension produced exhibits a pH of 3.4 thereafter. The shearing unit is then cut off.

The suspension is diluted with 28 l water and conveyed by means of a centrifugal pump with 4.5 bars supply pressure onto a hydrocyclone. The ratio of coarse material suspension to fine material suspension is 1:12.

The fine material suspension is passed over a plate-and-frame press and washed sulfate-free.

The washed filter cake is redispersed using an Ultra-Turrax with the addition of water in such a manner that a suspension of 80 g/l is produced. An alkyl dimethylbenzyl ammonium chloride (BARQUAT®) is added to the suspension, so that 0.8 g/l active substance is present in the suspension.

This suspension runs through a sieve with a mesh size of 120 $\mu$m, which retains coarse foreign particles. The suspension is spray-dried immediately thereafter. The atomization takes place by means of a two-fluid nozzle.

The dried product has the following physical and chemical properties:

| pH (DIN 53200) | 6.0 |
| --- | --- |
| Water content (DIN) | 4.8% |
| Specific surface (DIN 66132) | 272 m$^2$/g |
| DBP absorption (ml/g) | 3.7 |
| Stamping density (DIN 53194) | 87 g/l |
| Particle size distribution (Coulter counter) | |
| <1 $\mu$m | 5% |
| 1–6 $\mu$m | 84% |
| >6 $\mu$m | 11% |

EXAMPLES 2–5

Precipitated silica is prepared as described in Example 1 with the sole difference that the time of the interruption of the addition of acid (equal to the waiting stage) is varied.

The physical and chemical data of the silica products obtained are ser forth in Table 1 below.

EXAMPLE 6

A precipitated silica is prepared as described in Example 1. In contrast to Example 1, the heating to 85° C. during the second phase of the addition of acid is eliminated. The waiting stage is 30 minutes.

The physical and chemical data of the precipitated silica obtained in this was set forth in Table 1 below.

EXAMPLE 7

A precipitated silica is prepared as described in Example 1. In contrast to Example 1, the waiting stage is 60 minutes. After the end of precipitation, 3.4 kg of an emulsion of silicon oil are added into the precipitated silica suspension.

The emulsion is prepared as follows:

0.24 parts by weight Emulan AF are dissolved in 80 parts by weight water. 20 parts by weight Baysilon oil ® AC 3031 are added under dispersion with an Ultra-Turrax.

The work-up of the precipitated silica suspension takes place as described in Example 1. The spray-dried precipitated silica is subsequently ground in an air-jet mill.

The physical and chemical data for this product are set forth in Table 3 below.

EXAMPLE 8

(Coating With Polyethylene Wax Emulsion)

A precipitated silica is prepared as described in Example 1. The waiting stage is 90 minutes. 45 l of the fine material suspension obtained is compounded with 625 g of a wax emulsion under agitation. The wax emulsion is prepared in an autoclave which can be heated with vapor and is provided with a dispenser. 4.8 parts by weight of an alkyl polyglycol ether (Marlowet ® GFW) are first dissolved in 81.0 parts by weight water at approximately 100° C. Then, 14.2 parts by weight low-pressure polyethylene wax are added and heated to 130° C. When 130° C. has been reached, the dispenser is turned on and the mixture dispersed for 30 minutes. During this time, the temperature is maintained between 130° C. and 140° C. After the dispenser has been turned off and the mixture cooled off to approximately 110° C., the finished emulsion is discharged.

The polyethylene wax used is characterized by the following characteristics:

| | |
|---|---|
| Average molecular weight | 1000 |
| Solidification point | 100–104° C. |
| Drop point | 110–117° C. |
| Density (g/cm$^3$) | 0.93. |

The precipitated silica suspension is worked up as described in Example 1. The spray-dried precipitated silica is then ground in an air-jet mill.

The physical and chemical data for this product are set forth in Table 3 below.

EXAMPLE 9

(Coating With Polyethylene Wax Emulsion)

A precipitated silica is prepared as described in Example 1. The waiting stage is 90 minutes. 45 l of the fine material suspension obtained is compounded with 860 g of a wax emulsion under agitation. The wax emulsion is prepared in an autoclave which can be heated with vapor and is provided with a dispenser apparatus. 4.8 parts by weight of an alkyl polyglycol ether (Marlowet ® GFW) are first dissolved in 81.0 parts by weight water at approximately 100° C. Then, 14.2 parts by weight low-pressure polyethylene wax are added and heated to 130° C. When 130° C. has been reached, the dispenser is turned on and the mixture dispersed for 30 minutes. During this time, the temperature is maintained between 130° C. and 140° C. After the dispenser apparatus has been turned off and the mixture cooled off to approximately 110° C., the finished emulsion is discharged.

The polyethylene wax used has the following characteristics:

| | |
|---|---|
| Average molecular weight | 2700 |
| Solidification point | 92–96° C. |
| Drop point | 102–110° C. |
| Density (g/cm$^3$) | 0.92. |

The precipitated silica suspension is worked up as described in Example 1. The spray-dried precipitated silica is then ground in an air-jet mill.

The physical and chemical data are set forth in Table 3 below.

EXAMPLE 10

The technical applications capabilities of the precipitated silicas obtained according to examples 7, 8 and 9 are compared in three test-paint formulations with a delustering agent prepared according to DE-PS 15 92 865. The data is compiled in Table 4 below.

The determination of the degree of glossiness is performed with gloss-measuring devices according to Lange and Gardner (ASTM D 523-53 T). According to Lange, the incidence and reflection angles are 45°, according to Gardner 60° and 85°. The grindometer value is determined according to ISO 1524 in black stoving lacquer.

The text-paint formulations and the method of procedure are described below.

A) Black stoving lacquer

| | parts by wt. |
|---|---|
| Paint prepaste TACK ® 1 | 7.5 |
| Alkydal ® R 40/60% in xylene | 47.0 |
| Maprenal ® MF 800/55% in isobutanol | 24.0 |
| Butanol | 5.0 |
| Ethyl glycol | 3.0 |
| Xylene | 8.5 |
| Butyl glycol | 3.0 |
| Baysilon ® oil OL 17 1% in xylene | 2.0. |

5 g precipitated silica as the delustering agent are stirred into 100 g paint with a wing agitator at 2000 rpms for 8 minutes. The viscosity of the mixture is set with xylene to a discharge time of 20 seconds (Ford beaker, DIN 4 mm nozzle).

The paint is sprayed onto metal sheets in a dry layer approximately 30 m thick, air-dried and annealed 30 min. at 180° C.

B) Polyester paint (UP paint)

| | parts by wt. |
|---|---|
| Roskydal ® 500 A | 36.0 |
| Roskydal ® tix 18 | 4.0 |
| Tert. butyl catechol 1% in monostyrene | 0.5 |
| Aerosil ® 200 | 0.3 |
| Barite, ground | 20.0 |
| Bayer titanium R-FD-1 | 10.5 |
| Green pigment 600 | 1.5 |
| Baysilon ® oil OL 17 1% in toluene | 2.0 |
| Ethyl acetate | 6.0 |
| Monostyrene | 18.4 |
| Octa-Soligen cobalt in toluene (2.2% Co) | 0.8. |

6.5 g precipitated silica as the delustering agent are added to 100 g of this paint mixture before processing and dispersed 8 minutes at 2000 rpms with a wing agitator. The viscosity of the mixture is adjusted with ethyl acetate to a run-off time of 20 seconds (Ford beaker, DIN 4 mm-nozzle). The paint mixture is applied in layer thicknesses of approximately 80 μm.

C) DD paint

| | parts by wt. |
|---|---|
| Desmophen ® 800 | 10.0 |
| Desmophen ® 1700 | 20.0 |
| NC-Chips E 730 | 4.0 |
| Butyl acetate 98% | 18.0 |
| Ethyl glycol acetate | 22.8 |
| Butoxyl | 5.0 |
| Shellsol ® A | 20.0 |
| Baysilon oil OL 17 10% in xylene | 0.2. |

10.8 g delustering agent and 36 g Desmodur ® L/75% in ethyl acetate are added to 100 g of the above mixture and dispersed 8 minutes at 2000 rpms with a wing agitator. The mixture is adjusted with ethyl acetate to a run-out time of 18 seconds (DIN beaker, 4 mm nozzle according to DIN 53211). The application is performed in layer thicknesses of 30–40 μm.

Table 4 shows that a distinct improvement of the delustering action can be determined in all test paint formulations over the state of the art.

TABLE 1

| | Waiting Stage Time (min.) | pH DIN 53200 | Water Content DIN 55921 (%) | Specific surface DIN 66132 (m²/g) | DBP absorption (ml/g) | Stamping density DIN 53194 (g/l) | Grain-size distribution (Coulter counter) | | |
|---|---|---|---|---|---|---|---|---|---|
| | | | | | | | <1 μm | 1-6 μm | >6 μm |
| Example 1 | 20 | 6.0 | 4.8 | 272 | 3.7 | 87 | 5 | 84 | 11 |
| Example 2 | 30 | 6.0 | 5.3 | 300 | 3.8 | 80 | 7 | 85 | 8 |
| Example 3 | 45 | 5.2 | 5.7 | 239 | 3.7 | 82 | 10 | 85 | 5 |
| Example 4 | 60 | 5.8 | 6.4 | 244 | 3.4 | 86 | 15 | 84 | 1 |
| Example 5 | 90 | 5.9 | 3.9 | 278 | 3.8 | 76 | 15 | 83 | 2 |
| Example 6 | 30 | 6.4 | 7.7 | 316 | 3.8 | 103 | 3 | 84 | 13 |

TABLE 2

| Product | Viscosity DIN 4 mm sec. | Parts by wt. Solvent per processing consistency | Grindometer value in μm | 5 = % gloss 60° length |
|---|---|---|---|---|
| From Example 1 | 33 | 1.5 | 50 | 38.5 |
| From Example 2 | 33 | 1.5 | 37 | 40.5 |
| From Example 3 | 32 | — | 28 | 42.5 |
| From Example 4 | 38 | 4.5 | 30 | 38.5 |
| From Example 5 | 31 | — | 28 | 47.0 |
| From Example 6 | 33 | — | 47 | 38.0 |
| Reference product according to DE-PS 24 14 478 | 39 | 5.5 | 40 | 38.5 |

TABLE 3

| | pH DIN 53200 | Water Content DIN 55921 (%) | Specific surface DIN 66132 (m²/g) | DBP absorption (ml/g) | Stamping density DIN 53194 (/gl/) | Carbon content (%) |
|---|---|---|---|---|---|---|
| From Example 7 | 6.2 | 4.7 | 250 | 3.7 | 64 | 1.7 |
| From Example 8 | 6.7 | 4.9 | 213 | 3.5 | 83 | 3.5 |
| From Example 9 | 6.7 | 4.9 | 203 | 3.6 | 79 | 4.0 |

TABLE 4

| | Black Stoving Varnish | | UP paint | | | DD paint | | |
|---|---|---|---|---|---|---|---|---|
| Product | Grindometer value in μm | Gloss 45° Lange | Gloss 45° Lange | Gloss 40° Gardner | Gloss 85° Gardner | Gloss 45° Lange | Gloss 60° Gardner | Gloss 85° Gardner |
| From Example 7 | 28 | 2.5 | 17 | 26 | 49 | 5.5 | 9 | 18 |
| From Example 8a | 30 | 2.5 | 8 | 13 | 22 | 6.5 | 10 | 17 |
| From Example 8b | 30 | 2.5 | 13.5 | 21 | 40 | 4.5 | 9 | 13 |
| Delustering agent according to DE-PS 15 92 865 | 26 | 4.5 | 44.5 | 59 | 86 | 22.5 | 36 | 68 |

The trade designations used in the examples have the following meanings:

| Product | Paint prepaste Tack ® 1 Composition (% by wt.) |
|---|---|
| Carbon black paste 1 | 18 pigment carbon black of class HCC<br>36 alkyd resin based on soya bean<br>46 solvent |

Alftalat AR 481 m

| | |
|---|---|
| Characteristic: | Short or medium oily, drying alkyd resins. |
| Areas of application: | Stoving varnishes and stoving first coats for metallic surfaces. Acid-hardening paints. Nitrocellulose combination paints. |

| | Alftalat AR 481 m |
|---|---|
| Composition of the 100% resin (approximate) | |
| Oil content (triglyceride) | 48% |
| Phthalic acid anhydride | 39% |
| Viscosity | |
| Run-out time 4, DIN 53211/29° C. s | 50-70 |
| 23° C. s | 40-60 |
| Dynamic viscosity | | |
| DIN 53177/20° C. | mPa · s | 215-300 |
| 23° C. | mPa · s | 175-250 |
| Color value | | |
| Iodine color value DIN 6162 | mg I/100 cm³ | <15 |
| Gardner color standard ASTM D 1544 | | <7 |
| Acid value DIN 53402 | mg KOH/g | 25 |
| Density (delivered form) 20° C. | g/cm³ | approx. 1.02 |
| Content of non-volatile portions DIN 53216 (2 g + 2 cm³ toluene/1 h 125° C.) | % | approx. 60 |
| Flash point (delivered form) DIN 53213 | °C. | approx. 27 |

Maprenal MF 800

Characteristic: Non-plasticizied, isobutyl-etherified melamine formaldehyde resins.

|  |  | Maprenal MF 8 800 |
|---|---|---|
| Viscosity (delivered form) |  |  |
| Run-out time 4, DIN 53211/20° C. s |  | 60–90 |
| 23° C. s |  | 50–80 |
| Dynamic viscosity |  |  |
| DIN 53177/20° C. | mPa · s | 250–430 |
| 23° C. | mPa · s | 220–360 |
| Color value (delivered form) |  |  |
| Iodine color value DIN 6162 | mg I/100 cm³ | <1 |
| Gardner color standard ASTM D 1544 |  | <1 |
| Acid value DIN 53402 | mg KOH/g | <1 |
| Density 20° C. | g/cm³ | approx 0.99 |
| Gasoline compatibility (n-heptane)DIN 53 187 melamine resin (delivered form) | cm³/1 g | 5–10 |
| Content of non-volatile components (delivered form) DIN 53216 (2 g + 2 cm³) Butanol/1 h 120° C.) | % | approx. 55 |
| Flash point (delivered form) DIN 53 213 | ° C. | approx. 31 |

Baysilone paint additive OL 17

Polyether-modified methyl polysiloxane

| Delivery tolerances: | appearance | clear, yellowish |
|---|---|---|
|  | iodine color value, DIN 6162 | max. 3 |
|  | viscosity, DIN 53015 23° C. | 650–850 mPa · s |
| Other characteristic data: | density, DIN 53217 20° C. | 1.025–1.050 g/ml |
|  | flash point, DIN 51758 | approx. 80 C. |
|  | surface tension, DIN 53914, 23° C. with Harkins-Jordan correction | approx. 21 mN/m |
|  | refractive index, 23° C. | 1.447–1.451 |
| Solubility: | gasoline hydrocarbons | u/l |
|  | benzene hydrocarbons | l |
|  | alcohols | l |
|  | esters | l |
|  | ketones | l |
|  | glycol ethers | l |
|  | glycol ether acetates | l |
|  | explanations: | l = soluble |
|  |  | u = insoluble |

Baysilon oil ® AC 3031

Chemical characterization polysiloxane diol

| Physical data |  |
|---|---|
| Melting temperature | <−60° C. (setting point) |
| Softening temperature |  |
| Boiling temperature | above approx. 130° C. |
| Decomposition temperature | °C. |
| pH | approx. 7–8 (at 20 g/l water) |
| Solubility in water | insoluble at 20° C. |
| Intrinsic odor | distinct intrinsic odor |
| State (20° C.) | liquid |
| Vapor pressure (20° C.) | <100 mbars |
| Density (20° C.) | 0.98 g/ml |

| Emulan AF |  |
|---|---|
| Chemical character | medium-highly ethoxylated fatty alcohol, non-ionic |
| Solubility (at 25° C., 10%) | Dissolves well and usually also clear in mineral oils, fatty oils, molten paraffins and fats. Dissolves clear in most organic solvents. |
| Chemical character | fatty alcohol ethoxylate |
| Consistency (room temperature) | like soft wax |
| Acid value (DIN 53402) | pract. 0 |
| Saponification value (DIN 53 401) | pract. 0 |
| pH (1% aqueous solution or dispersion) | 6–7.5 |
| Active substance content | pract. 100% |
| Density (c/cm³) (20° C.)(DIN 53757) | approx. 0.91 (50° .C) |
| Viscosity (mPa · s) (20° C.) (DIN 53015) | — |
| Melting point | approx. 42° C. |
| Solidification point | — |
| Drop point (DGF M-III-3) | — |
| Flash point (DIN 51758) | approx. 190° C. |
| HLB value (W. C. Griffin) | approx. 11 |
| Chief active tendency (Emulsion type) | oil in water |
| Solubility tendency | in mineral oil and polar organic media |

| Alkydal R 40 |  |
|---|---|
| Short-oily alkyd resin based on ricin oil |  |
| Oil content/triglyceride | approx. 40% |
| Phthalic acid anhydride | approx. 38% |
| Density/20° C. | approx. 1.13 g/cm³ |
| OH content | 2.5% |
| Delivery tolerance |  |
| Iodine color number/50% solution | max. 5 |
| Acid value/solvent-free | 20–30 |
| Viscosity/20° C. delivery form | 3500–4500 mPa · s (cP) |
| Flash point | approx. 27° C. |

| Roskydal 500 A |  |
|---|---|
| Unsaturated polyester resin (glossy polyester), reactive, hardens hard |  |
| Delivery tolerance[1] |  |
| Non-volatile portion | 74–77% |
| Hazen color | max. 100 |
| Acid value/delivery form | 10–20 |
| Viscosity/20° C. | 2200 ... 2600 mPa · s |
| Other data: |  |
| Density/20° C. | approx. 1.12 g/cm³ |
| Flash point | approx. 37° C. |

[1]test methods according to DIN 58184

Roskydal tix 18

Thixotropic, unsaturated polyester resin (paraffin type), reactive

| Supply tolerance[2] |  |
|---|---|
| Non-volatile portion | 49 ... 53% |
| Iodine color value | max. 2 |
| Acid value/delivery form | max. 15 |
| Viscosity 20° C. | thixotropic flow behavior |
| Flash point | approx. 32° C. |

[2]test methods according to DIN 53184

| Bayertitan | % TiO$_2$ | Additional Components | Bayertitan R-FD-1 Oil Number [adsorption] according to DIN 53 199 | Brightening Capacity according to Reynolds according to DIN 53 192 | Rel. Scattering Power according to DIN 53 165 | Density according to DIN 53 193 |
|---|---|---|---|---|---|---|
| F-FD-1 | 96 | Al$_2$O$_3$ | 19 | 1900 | 750 | 112 | 4 |

| Green pigment 6001 | Green pigment 6001 |
|---|---|
| Color index No. | 77 335 |
| Color index pigment | 19 |
| Chemical composition | Co—Al—Ti—Ni Zn oxide |
| Oil number (1) g/100 g | 20 |
| Drying loss (2) % | max. 0.5 |
| Stamping density (3) g/l | 1600 |
| Sieve residue (4) % | max. 0.1 |
| Color strength (7) | — |
| Covering capacity value (8) % | 190 |
| Particle size (TEM) m | 0.15–2.0 |
| Density (9) g/cm$^3$ | 5.0 |
| Water-soluble portion (10) % | max. 0.5 |
| Spec. surface (11) m$^2$/g | — |
| pH (12) | 8.5–9.5 |
| Heat resistance °C. | >500 |
| Light resistance/ full shade (13) | 8 |
| TiO$_2$ mixture 1:1 | 8 |
| TiO$_2$ mixture 1:10 | 8 |
| Weather resistance/ full shade | very good |
| Acid resistance | very good |
| Alkali resistance | good |
| Lime resistance | good |
| Solvent resistance | very good |
| Migration resistance | very good |

Explanation of the footnotes:
(1) according to DIN ISO 787/V, ASTM D 281 or JIS K 5101/9
(2) according to DIN ISO 787/II, ASTM D 280 or JIS K 5101/21. In the case of VOSSEN blue, the reweighing is performed immediately after removal of the specimen from the drying oven in a hot state.
(3) according to DIN ISO 787/XI of JIS K 5101/18
(4) Cd, Co and Ti pigments according to DIN 53 195 (0.045 μm sieve) VOSSEN blue according to DIN ISO 787/XVIII, (0.040 sieve) [sic], ASTM D 1714 or JIS K 5101 20
(5) according to ISO 787/I
(6) according to ISO 787/XVI
(7) according to DIN 53 204 and DIN 53234
(8) soft in PVC, TiO2 RN 56 = 100%
(9) according to DIN ISO 787/X or JIS K 5101/17
(10) according to DIN ISO 787/III or JIS K 51010/22
(11) according to DIN 66 131
(12) according to DIN ISO 787/IX, ASTM D 1208 or JIS K 5101/24
(13) according to DIN 54 003 or JIS K 5101/15

Octa-Solingen cobalt

Octa-Solingen cobalt is a dry substance which contains 16% Co in addition to 2-n ethyl hexanoic acid (C$_8$H$_{16}$O$_2$).

| Desmophen 800 | | |
|---|---|---|
| Heavily branched polyester containing hydroxyl groups. Characteristic values | | |
| Delivery form | 100% | approx. 85% |
| Hydroxyl content: | approx. 8.8% | approx. 7.5% |
| Acid value: | <4 | <4 |
| Color value according to DIN 6162: | 7–10* | 3–8* |
| Flash point according to DIN 51 758: | >200° C. | — |
| to DIN-EN 53 | — | approx. 49° C. |
| Density at 20° C. according to DIN 51 757: | 1.14 g/cm$^3$ | approx. 1.11 g/cm$^3$ |
| Viscosity (velocity gradient D 150 s$^{-1}$) at 20° C.: | 900 ± 100 mPas** 725 ± 75 | 900 ± 100 mPas** 725 ± 75 |
| Water content: | <0.15% | <0.15% |

*50% in ethyl glycol acetate
**70% in ethyl glycol acetate

Aerosil ® 200

Aerosil ® 200 is a pyrogenically prepared silicic acid with the following physical and chemical characteristic values:

| | | |
|---|---|---|
| Surface according to BET | m$^2$/g | 200 ± 25 |
| Average size of the primary particles | nanometer | 12 |
| Stamping density (1) | g/l | approx. 50 |
| Drying loss (2) (2 h at 105° C.) upon leaving the works | % | <1.5 |
| Annealing loss (2)(6) (2 h at 1000° C.) | % | <.1 |
| pH (3) (in 4% aqueous dispersion) | | 3.6–4.3 |
| SiO$_2$ (5) | % | >99.8 |
| Al$_2$O$_3$ (5) | % | >0.05 |
| Fe$_2$O$_3$ (5) | % | >0.003 |
| TiO$_2$ (5) | % | >0.03 |
| HCl (5) | % | >0.025 |
| Sieve residue (4) according to Mocker (45 m) | % | >0.05 |

Technical Data of the Aerosil Standard Types 1) according to DIN 53 194
2) according to DIN 55 921
3) according to DIN 53 200
4) according to DIN 53 580
5) in relation to the substance annealed 2 hours at 1000° C.
6) in relation to the substance dried 2 hours at 105° C.
7) HCl content is a component of the annealing loss

| Desmophen 1700 | |
|---|---|
| Linear polyester containing hydroxyl groups Characteristic data | |
| Hydroxyl content: | approx. 1.2% |
| Equivalent weight: | approx. 1418 |
| Color value according to DIN 6162*: | max. 5 |
| Flash point according to DIN 51758: | >200° C. |
| Density at 20° C. according to DIN 53217: | approx. 1.19 g/cm$^3$ |
| Viscosity at 23° C.** (velocity gradient D ≈ 190 s$^{-1}$) | 575 ± 75 mPa · s |
| Water content: | >0.15% |

*50% in ethyl glycol acetate
**70% in ethyl glycol acetate

NC-Chips E 730

NC-Chips E 730 is a collodion cotton [c.c. (wool), pyrocellulose, soluble nitrocellulose, pyroxyline]

Shellsol ® A

Shellsol ® A is a carbon solvent rich in aromatic hydrocarbons with the following data:

| | |
|---|---|
| Boiling limits °C. ASTM D 107/86 | 160–182 |
| Density at 12° C. ASTM D-1298 | 0.874 |
| Flash point °C. AP IP 170 PM ASTM D-93 | 47 |
| Evaporation number (ether = 1) DIN 53 170 | 46 |
| Refraction index $n \frac{20}{D}$ DIN 53 169 | 1.499 |
| Color (Saybolt) ASTM D-156 | +30 |
| Viscosity 25° C. mm$^2$/s ASTM D-445 | 0.810 |
| Aniline [cloud] point °C. = mixes ASTM D 611 | 15 |
| Kauri-butanol value ASTM D-1133 | 90 |
| Aromatic hydrocarbon content vol. % ASTM D-1319 | 19 |
| Surface tension at 20° C. mN/m ASTM D-971 | 29.5 |

Desmodur L

Aromatic polyisocyanate

| Characteristic data | 75% delivery form | 67% delivery form |
|---|---|---|
| NCO content*: | approx. 13% | approx. 11.6% |
| Equivalent weight: | approx. 323 | approx. 362 |
| Color value according to DIN 6162*: | max. 5 | max. 5 |
| Flash point according to DIN 53 213: | approx. +1° C. | approx. −38° C. |
| Density at 20° C. according to DIN 53217: | approx. 1.17 g/cm$^3$ | approx. 1.15 g/cm$^3$ |
| Viscosity at 23° C. (mPa · s)* | 1500 ± 400 | 1500 ± 400 |
| Monomeric diisocyanate content | >0.5% | >0.5% |

*Delivery specification

The term "DIN" stands for German industrial standard.

As will be apparent from the above, many different film forming components such as synthetic resins and mixtures with or without pigments are suitable for combination with the finely divided precipitated silica delustering agent of this invention. Further modifications and variations will be apparent to those skilled in the art and are intended to be encompassed by the claims appended hereto.

German priority application P 38 15 670.9-41 is incorporated and relied on herein.

We claim:

1. A finely divided precipitated silica with high structure having the following properties:

| | |
|---|---|
| BET surface (DIN 66 132) | of 150 to 350 m$^2$/g |
| Stamping density (DIN 53 194) | between 60 and 120 g/l |
| DBP absorption number | between 3.0 and 4.0 ml/g |
| Particle size distribution | at least 70% from 1 to 6 μm. |

2. A method of preparing finely divided precipitated silica with a high structure having the following properties:

| | |
|---|---|
| BET surface (DIN 66 132) | of 150 to 350 m$^2$/g |
| Stamping density (DIN 53 194) | betweeen 60 and 120 g/l |
| DBP absorption number | between 3.0 and 4.0 ml/g |
| Particle size distribution | at least 70% from 1 to 6 μm, | comprising:
forming a mixture of water and sodium silicate, heating said mixture under agitation to a temperature of 70° to 80° C.,
adding concentrated sulfuric acid to said mixture until half of the sodium present in the mixture has been neutralized, agitating the reaction mixture formed thereby by a shearing action after a waiting period of 30 to 120 minutes, adding sulfuric acid until the pH of the silica suspension produced thereby is 3.0 to 3.5, filtering the suspension to filter the silica off to obtain a silica filter cake, washing the silica filter cake to remove sulfate, dispersing the silica filter cake in water by the addition of water using agitation to form a suspension with a solids content of 80±10 g/l, and recovering the product.

3. The method according to claim 2 wherein while shearing the reaction mixture is treated by heating to a temperature of 86°±5° C.

4. The method according to claim 2 wherein the silica suspension is diluted with water after reaching the pH of 3.0 to 3.5.

5. The method according to claim 2 wherein the suspension contains a portion which is separated by a centrifugal pump and a hydrocyclone.

6. The method according to claim 2 wherein alkyl dimethylbenzyl ammonium chloride is added to the suspension after the silica filter cake is dispersed in water.

7. The method according to claim 2 wherein the suspension is spray-dried to recover the product.

8. The method according to claim 2 wherein the recovered product is dried and ground.

* * * * *